US006269521B1

(12) United States Patent
Gabel

(10) Patent No.: US 6,269,521 B1
(45) Date of Patent: Aug. 7, 2001

(54) THREE LINK, PLURAL AXES HINGE SYSTEM FOR UPWARD ROTATIONAL AND TRANSLATIONAL OPENING OF A CLOSURE PANEL

(75) Inventor: Charles E. Gabel, Wyandotte, MI (US)

(73) Assignee: Davis Industries, Plymouth, MI (US)

( * ) Notice: Subject to any disclaimer, the term of this patent is extended or adjusted under 35 U.S.C. 154(b) by 0 days.

(21) Appl. No.: 09/152,560

(22) Filed: Sep. 14, 1998

(51) Int. Cl.[7] .............................. E05F 1/08; E05D 15/06; F16H 21/44; B62D 25/10

(52) U.S. Cl. ................................ 16/287; 16/306; 16/361; 296/76; 296/146.12; 74/100.1; 49/249

(58) Field of Search ............................. 16/306, 287, 288, 16/289, 302, 361, 370; 49/246, 248, 249, 250; 296/76, 146.12; 180/69.2, 69.21; 74/100.1, 97.1

(56) References Cited

U.S. PATENT DOCUMENTS

| | | | | |
|---|---|---|---|---|
| 2,091,673 | * | 8/1937 | De Orlow | 16/370 X |
| 2,154,733 | * | 4/1939 | De Orlow | 16/287 X |
| 2,414,984 | * | 1/1947 | Steele | 49/250 X |
| 2,698,959 | * | 1/1955 | Vigmostad | 16/306 X |
| 2,895,161 | * | 7/1959 | Badura | 16/306 X |
| 3,236,552 | * | 2/1966 | Percifull | 49/249 X |
| 4,223,420 | | 9/1980 | Yukimoto et al. | 525/310 |
| 4,679,841 | | 7/1987 | Taunay | 296/76 |
| 4,884,614 | * | 12/1989 | Spurling | 160/225 |
| 5,050,270 | | 9/1991 | Burgei et al. | 16/298 |
| 5,544,388 | | 8/1996 | Chiura | 16/375 |
| 5,557,829 | | 9/1996 | Schoen et al. | 16/375 |
| 5,758,389 | | 6/1998 | Wolda | 16/308 |
| 5,833,300 | * | 11/1998 | Russke | 49/249 X |

FOREIGN PATENT DOCUMENTS

| | | | |
|---|---|---|---|
| 28 40 053 | | 9/1978 | (DE) . |
| 33 09 977 A1 | | 3/1983 | (DE) . |
| 196 23 036 A1 | * | 11/1997 | (DE) . |

* cited by examiner

*Primary Examiner*—Anthony Knight
*Assistant Examiner*—Robert L. Pilaud
(74) *Attorney, Agent, or Firm*—Brooks & Kushman P.C.

(57) ABSTRACT

A hinge (10) for upwardly moving and rotating a closure panel (20) of a base (14) is provided to improve access and utilization of the area covered by the closure panel (20). The hinge (10) includes two brackets, a closure panel bracket (18) mountable to the closure panel (20) and a base member bracket (12) mountable to the base (14). A cooperative tripartite set of links are disposed between the brackets and are operatively connected to a biasing member (100). The biasing member (100) urges the links to upwardly translate and rotate the closure panel bracket (18) from the base member bracket (12). The set of links include a biasing link (76), an intermediate link (74), and an anchoring link (72). The link set is adapted for cooperative movement so as to facilitate an upward rotational and translational progression of the closure panel (20) in relation to the base (14).

20 Claims, 3 Drawing Sheets

THREE LINK, PLURAL AXES HINGE SYSTEM FOR UPWARD ROTATIONAL AND TRANSLATIONAL OPENING OF A CLOSURE PANEL

TECHNICAL FIELD

The present invention relates generally to a hinge, and more particularly, to a hinge for mounting a closure panel for swinging upwardly and downwardly from a normally closed configuration to an open configuration with respect to a base.

BACKGROUND ART

Hinges for opening and closing closure panels of a base are well known in the prior art. For example, in the automotive environment closure panels such as trunk lids have utilized gooseneck hoop-type hinges. Conventional gooseneck hoop-type hinges have protruding hoops that extend down into the cargo area when the trunk lid is closed and limit useable cargo space. The gooseneck hoop of these hinges are required to enable the closure panel, or trunk lid, of the automobile to move or rotate clear of the vehicle body while allowing for maximum access to the trunk compartment. The intrusion of the gooseneck hoop arms takes up considerable cargo area space thus reducing the capacity of the trunk area.

SUMMARY OF THE INVENTION

Accordingly, it is an objective of the present invention to provide a hinge which is self contained, having no movable parts extending below the hinge's base member bracket.

It is a further object of the present invention to provide a hinge for moving the closure panel of a base sufficiently clear of the base (in excess of 90 degrees) so as to allow for the greatest amount of access to the area below the closure panel.

It is still a further object of the present invention to provide a hinge which may be modified to fit a specific closure panel and base.

In carrying out the above objects and other objects and features of the present invention, a hinge for upwardly moving and rotating the closure panel of a base is provided to improve access and utilization of the area covered by the closure panel. The hinge includes two brackets, a closure panel bracket mountable to the closure panel and a base member bracket mountable to the base. A cooperative tripartite set of links are disposed between the brackets and are operatively connected to a biasing member. The biasing member urges the links to upwardly translate and rotate the closure panel bracket from the base member bracket.

The set of links include a biasing link, an intermediate link, and an anchoring link. The biasing link has a driving end pivotally connected to the biasing member and a driven end pivotally connected to the driving end of the intermediate link and to a major axis of the closure panel bracket. The intermediate link has a fixed driven end pivotally mounted to the base member bracket and a driving end rotatably mounted to the closure panel bracket and the driven end of the biasing link. The anchoring link has a driving end pivotally connected to the closure panel bracket and a fixed driven end being rotatably mounted to the base member bracket. The link set is adapted for cooperative movement so as to facilitate an upward rotational and translational progression of the closure panel in relation to the base.

The advantages accruing to the present invention are many. The present invention being self contained does not intrude upon the area below the closure panel. The hinge contains no movable parts which extend below the hinge's base member bracket. Thus, the area below the closure panel is maximized. Additionally, the present invention allows the closure panel of a base to be moved clear (in excess of 90 degrees) of the base, allowing for greater access to the area covered by the closure panel.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
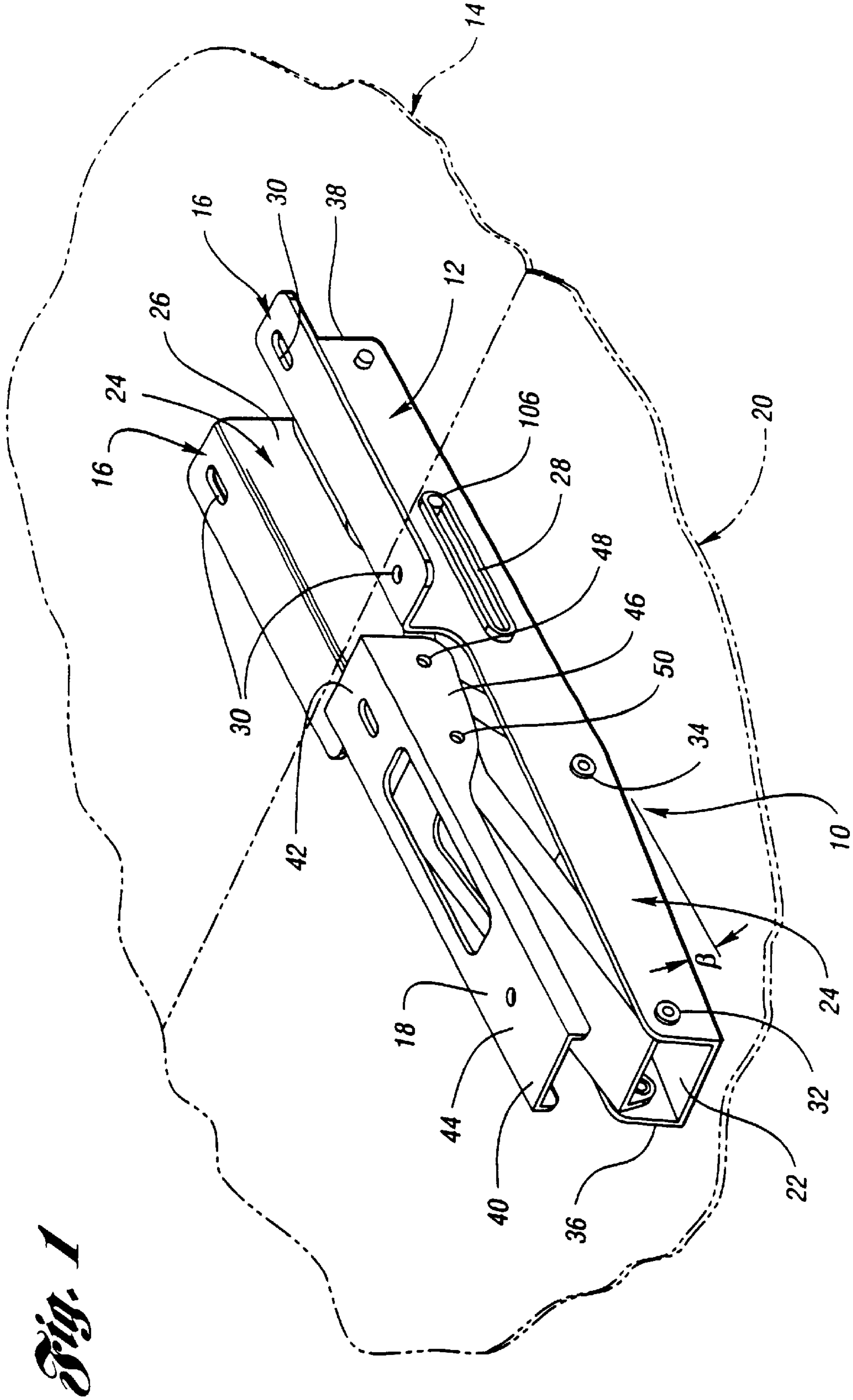
FIG. 1 is a quartering perspective view of the present invention.
Figure 2:
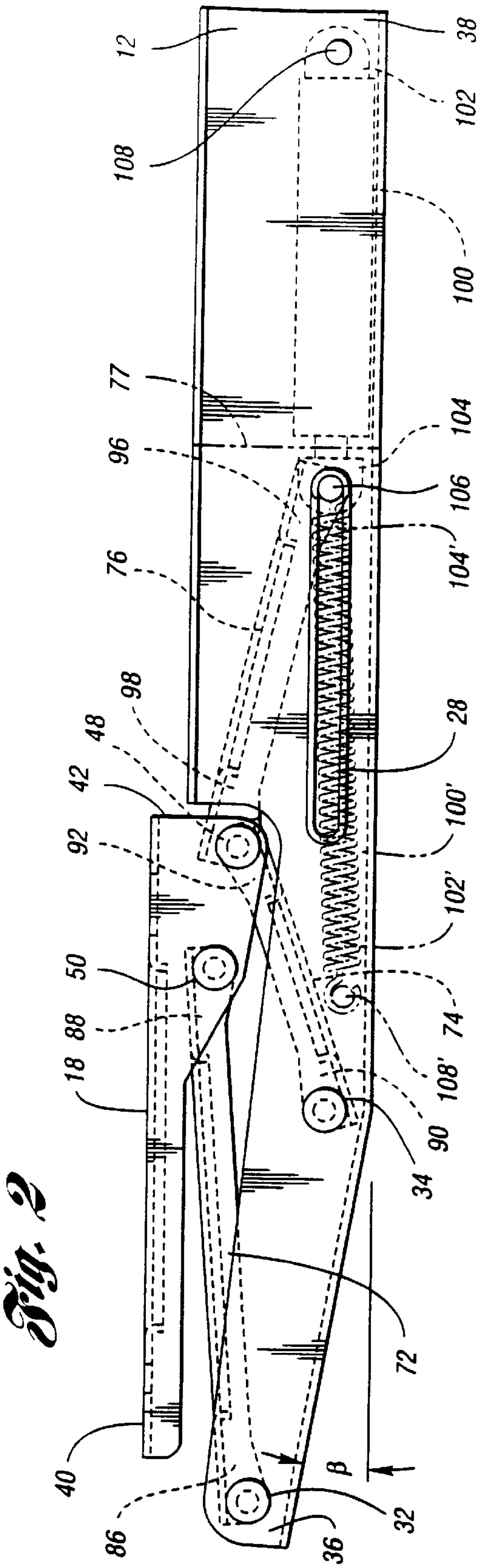
FIG. 2 is a side view of the present invention.

Referring now to FIGS. 1 and 2, a hinge 10 is illustrated. The hinge 10 is comprised of a base member bracket 12, a tripartite set of links 72, 74, and 76, a biasing member 100 and a closure panel bracket 18.

With continuing reference to FIG. 1, base member bracket 12 forms an elongated channel 26. Elongated channel 26 has a bottom 22, a pair of identical opposing sides 24, and a pair of flanges 16. The sides 24 of the elongated channel 26 are perpendicular to and extend upward from the bottom 22. The flanges 16 extend laterally from the sides 24 and contain a plurality of holes 30 for receiving fasteners for fixedly securing the base member bracket 12 to a base 14.

Base member bracket 12 further includes, an outer end 36 and an inner end 38. The outer end 36 of base member bracket 12 is raised by an angle $\beta$with respect to the inner end 38. The rise of the outer end 36 allows for the overall length of the base member bracket to be shortened while still providing the desired trunk lid movement, initial, and final positioning. A major axis of rotation 32 and a minor axis of rotation 34 are disposed on the outer end 36 of base member bracket 12. A longitudinal pair of identical slots 28 are positioned between the outer end 36 and the inner end 38 of the base member bracket 12 on each of the opposing sides 24.

It can be appreciated that a plurality of hinges 10 may be used in a given application, for example, in an automotive trunk closure panel application, two hinges would be used, one for the left and one for the right hand side. The present invention may be used without differentiating between the left hand side and right hand side as the best mode for carrying out the invention may be used on the left or right hand side without structural modification of the hinge or the base.

With continuing reference to FIG. 1, the closure panel bracket 18 is illustrated. Closure panel bracket 18, forms an elongated channel with a top 44 and a pair of opposing sides 46. A plurality of apertures are located on the top 44 for the purposes of weight reduction and attachment of the closure panel bracket 18 to the closure panel 20. Additionally, closure panel bracket 18 has an outer end 40 and an inner end 42. A major axis of rotation 48 and a minor axis of rotation 50 are located on the inner end 42 of closure panel bracket 18.

Referring now to FIG. 2, a side view of hinge 10 is illustrated. A tripartite set of links are shown which connect the closure panel bracket 18 to the base member bracket 12. The tripartite set of links include an anchoring link 72, an intermediate link 74 and a biasing link 76. The anchoring link 72 has a fixed driven end 86 rotatably connected to the major axis of rotation 32 of base member bracket 12 and a driving end 88 pivotally connected to the minor axis of rotation 50 of the closure panel bracket 18. Intermediate link 74 has a fixed driven end 90 pivotally connected to the minor axis of rotation 34 of base member bracket 12 and a driving end 92 pivotally connected to the major axis of rotation 48 of closure panel bracket 18. Finally, the biasing link 76 has a driven end 98 pivotally connected to major axis of rotation 48 of closure panel bracket 12 and a driving end 96 pivotally connected to a biasing member 100. Biasing member 100 may be comprised of a gas spring or a helical spring or a similar biasing element well known in the applicable art. The driving end 96 of biasing link 76 is further slidably connected to the slot 28 of base member bracket 12. The biasing member 100 has a fixed end 102 securedly connected to the inner end 38 of the base member bracket 12 and a driving end 104 pivotally connected to the driving end 96 of the biasing link 76. The fixed end 102 is securedly connected to the base bracket 12 by a fixed pin 108 (shown in greater detail in FIG. 3). The driving end 104 is further slidably engaged to slots 28 by a guide pin 106 protruding from both sides of the driving end 104 of the biasing member 100.

Figure 3:
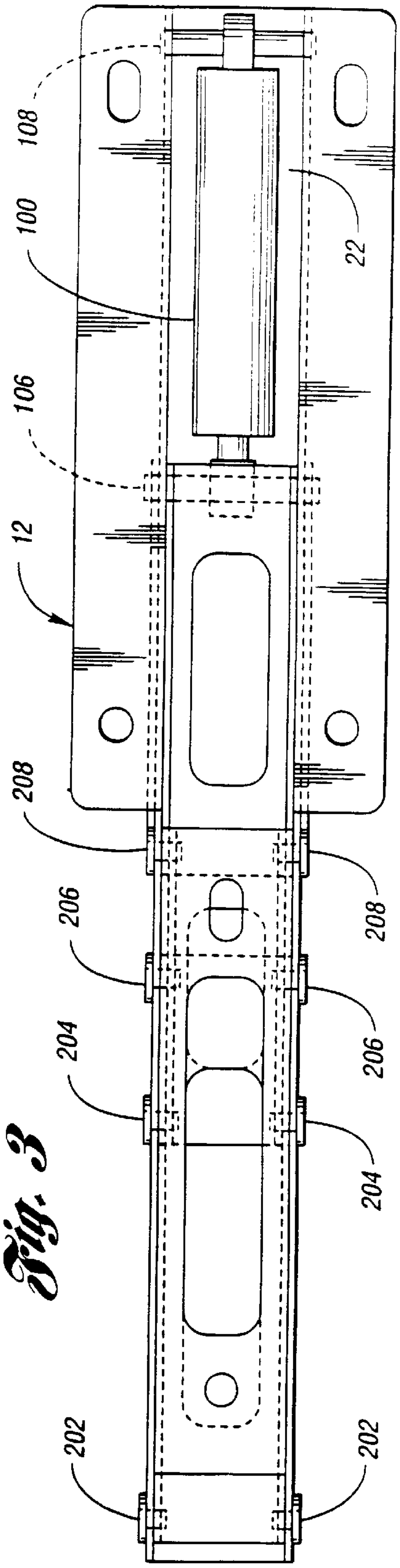
FIG. 3 is a plan view of the present invention.

Referring to FIG. 3, the method of attachment of the links 72, 74, and 76 and the biasing member 100 can be appreciated. The tripartite set of links may be securedly connected to both the closure panel bracket 18 and the base member bracket 12 by the use of rivets and bushings. Both rivets and bushings are well known in the applicable art.

The rivets 202 and 204 are used to create the major axis of rotation 32 and the minor axis of rotation 34 of base member bracket 12 respectively. Similarly, shouldered rivets 206 and 208 create the major axis of rotation 48 and the minor axis of rotation 50 of the closure panel bracket 18 respectively. Additionally, the attachment scheme of biasing member 100 is shown. Guide pin 106 and fixed pin 108 secure the position of biasing member 100 within the elongated channel 22 of the base member bracket 12.

Figure 4:
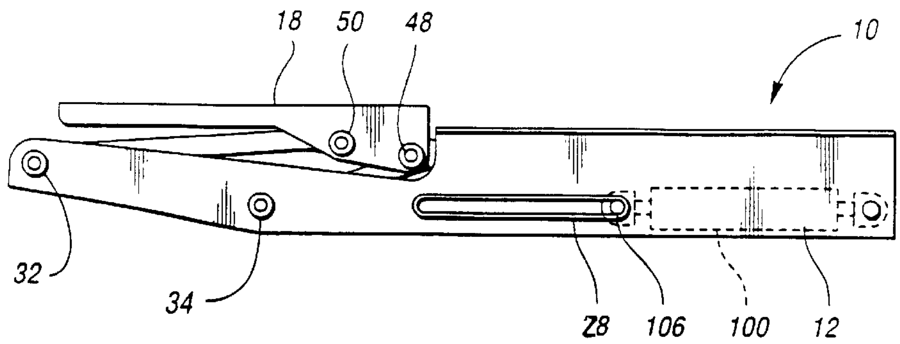
FIG. 4 is a side view of the present invention showing the hinge in the closed configuration.
Figure 5:
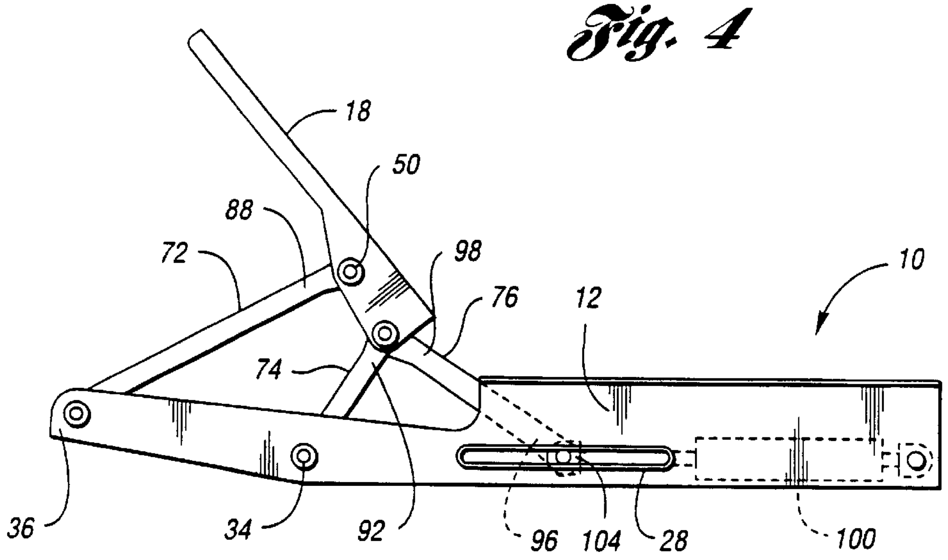
FIG. 5 is a side view of the present invention showing the hinge in an intermediate configuration.
Figure 6:
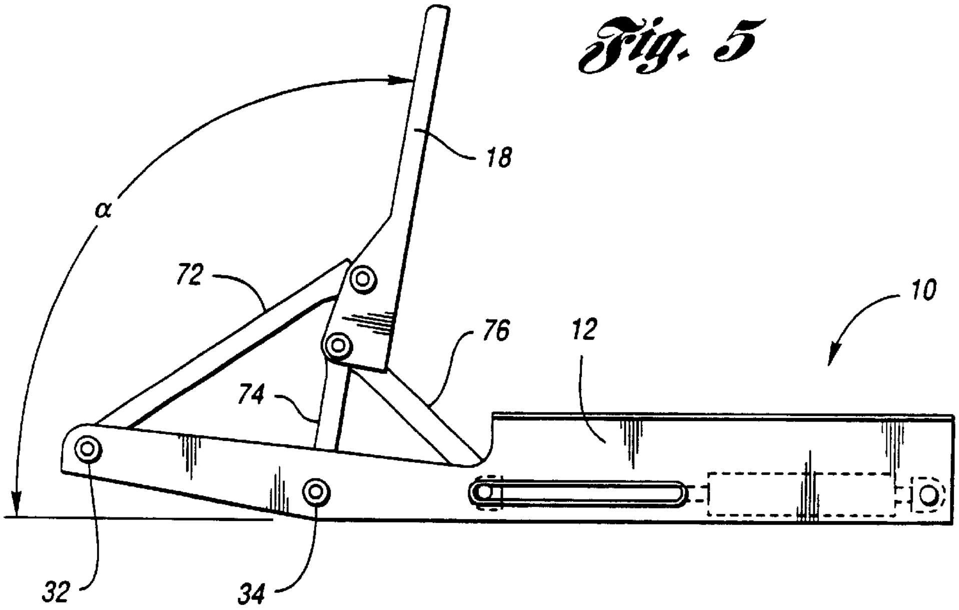
FIG. 6 is a side view of the present invention showing the hinge in the open configuration.

Reference is now made to FIGS. 4–6 for a better understanding of the operation of hinge 10. FIG. 4 depicts hinge 10 in the closed configuration. In this configuration, the closure panel 20 fixedly attached to closure panel bracket 18 is closed with respect to the base 14. In the automotive environment the closure panel 20 would be a trunk lid and the base 14 would be a trunk compartment of an automobile (more precisely the underside of the package tray). When the trunk lid is in the closed configuration as shown in FIG. 4 it would be in contact with a seal or gasket (not shown) extending around the entire trunk opening. The trunk lid/gasket contact operates to prevent moisture from entering the trunk compartment. Additionally, while in the closed configuration the trunk lid is flush with the vehicle body so as to provide for proper alignment of the entire trunk lid edge with the edge of the entire trunk opening.

While in the closed configuration the driving end 96 of the biasing link 76 compresses the biasing member 100. In this state the biasing member 100 is at its maximum state of compression and directs an urging force on the driving end 96 of the biasing link 76. As the driving end 96 of the biasing link 76 is encouraged along the slots 28 the biasing force generated by the biasing member 100 decreases to a minimum level which is sufficient to prevent the closure panel 20 from leaving the open configuration.

Now with reference to FIG. 5, hinge 10 is shown in an intermediate configuration. As the closure panel 20 (trunk lid) is opened, the driving end 104 of the biasing member 100 urges the driving end 96 of biasing link 76 along the slots 28. The driven end 98 of biasing link 76 is urged toward the outer end 36 of base member bracket 12 and in turn commands the driving end 92 of intermediate bracket 74 to rotate about the minor axis of rotation 34 of base member bracket 12. The rotation of intermediate link 74 causes an initial rearward movement of the closure panel bracket 18. As the driving end 96 of the biasing link 76 continues down the slots 28 the driving end 88 of the anchoring link 72 induces the closure panel bracket 18 to rotate about its minor axis 50 while the driving end 92 of the intermediate link 74 and the driven end 98 of the biasing link 76 cooperate to rotate the closure panel bracket 18 about the major axis of rotation 48. The non-linear translation of closure panel bracket 18 with respect to the base is finally halted when the driving end 96 of the biasing link 76 reaches the end of slots 28.

In the fully open configuration shown in FIG. 6, closure panel bracket 18 has traveled through an angle of rotation a which is greater than 90° with respect to the base member bracket 12. The non-linear translation of the closure panel bracket 18 with respect to the base member bracket 12 starting from the closed configuration through to the open configuration may be modified. A given automobile style or base configuration may require that the closure panel 20 (trunk lid) follow a prescribed non-linear progression to avoid crashing into a certain body structure i.e. the rear widow or shelf below the rear window. The desired motion may be accomplished by changing the lengths of the links 72, 74, and 76 and/or changing the locations of the major axis of rotation and minor axis of rotation of the closure panel bracket 18 and the base member bracket 12. For example, if it is desirous to increase the angle $\alpha$ shown in FIG. 6, one way to achieve this would be to increase the length of the anchoring link 72 while holding the lengths of the intermediate link 74 and the biasing link 76 constant. In the alternative the same result may be achieved by locating the minor axis of rotation 34 of base member bracket 12 closer to the major axis 32 of base member bracket 12.

It can be further appreciated that added features such as adjustable length links and movable major and minor axes of rotation will provide a single hinge design which is easily modifiable to fit a variety of closure panel and base configurations. More specifically, the link set may be comprised of links having a length adjustment means. The length adjustment means could be a threaded bolt with locking nuts where each end of a link is screwed onto the ends of the threaded bolt. When it is desired to shorten the length of a link one or both of the ends of a link may be screwed toward the other link end. Similarly, when a link is required to be longer the link ends may unscrewed so that the ends move further away from each other. The desired length may then be locked into place using the locking nuts which prevent each link end from advancing or retracting on the threaded bolt.

With respect to a movable major axis of rotation and a movable minor axis of rotation of the closure panel bracket

18 and the base member bracket 12 a closure panel bracket slot and a base member bracket slot in each bracket would be required. The closure panel bracket slots in the closure panel bracket 18 would be located at the inner end 42 of the closure panel bracket 18 and contain the closure panel bracket major axis of rotation 48 and the closure panel bracket minor axis of rotation 50. The base member bracket slot in the base member bracket 12 would be located at the outer end 36 of the base member bracket 12 and contain the base member bracket major axis of rotation 32 and the base member bracket minor axis of rotation 34. The closure panel bracket major axis of rotation and closure panel bracket minor axis of rotation are adapted to slide and then be fixedly secured to the closure panel bracket 18. Analogously, the base member bracket major axis of rotation and base member bracket minor axis of rotation are adapted to slide and then be fixedly secured to the base member bracket 12.

Reference again is made to FIG. 2, where an alternative embodiment of the present invention is shown. The alternative embodiment includes the structure presented above with a helical spring 100' replacing the air spring 100. Additionally, modifications to the base member bracket 12 are required. The helical spring 100' is attached at its fixed end 102' to a pin 108' and at its fixed driving end 104' to guide pin 106. The helical spring 100' operates in the same capacity as the air spring 100, namely to urge the links 72, 74, and 76, to upwardly lift and translate the closure panel 20 from a closed configuration to an open configuration. An added advantage of this embodiment is that base member bracket 12 may be shortened as indicated by the perforated line 77 shown in FIG. 2. This embodiment of the present invention enables the hinge 10 to be located and attached in smaller bases or trunk compartments. The additional advantages of a reduced material cost and a reduction in overall weight can also be appreciated.

From the foregoing, it will be apparent that the present invention brings to the art a new and improved hinge 10 which allows for proper movement of the closure panel 20 while taking up comparatively little space in a base compartment.

Many changes and modifications in the above described embodiment of the invention can, of course, be carried out without departing from the scope thereof. Accordingly, that scope is intended to be limited only by the scope of the appended claims.

What is claimed is:

1. A hinge for interconnecting a closure panel and a base, so that the closure panel may move rotationally and translatably between an open configuration and a closed configuration in relation to the base, the hinge comprising:

a closure panel bracket associated with the closure panel, the closure panel bracket having a closure panel bracket major axis of rotation and a closure panel bracket minor axis of rotation;

a base member bracket associated with the base, the base member bracket having a base member major axis of rotation about which an anchoring link may rotate and a base member minor axis of rotation about which an intermediate link may rotate; and a link set having:

a biasing link having a biasing driving end and a biasing driven end;

the intermediate link having an intermediate fixed end and an intermediate driving end; and the anchoring link having an anchoring driving end and an anchoring fixed end; and a biasing member fixedly mounted upon the base member bracket;

the biasing driving end of the biasing link being pivotally connected to the biasing member, the biasing driving end being constrained to move reciprocatively and axially; the biasing driven end of the biasing link being pivotally connected to the intermediate driving end of the intermediate link and to the closure panel bracket proximate the closure panel bracket major axis of rotation;

the intermediate fixed end of the intermediate link being rotatably mounted upon the base member bracket at the base member minor axis of rotation;

the anchoring driving end of the anchoring link being connected to the closure panel bracket at the closure panel bracket minor axis of rotation; and the anchoring fixed end of the anchoring link being rotatably mounted upon the base member bracket proximate the base member major axis of rotation, the link set being adapted for cooperative movement among the biasing, intermediate, and anchoring links and the biasing member so as to facilitate the rotational and translational movement of the closure panel in relation to the base, such that the link set does not extend below the base member bracket when the closure panel is in the closed configuration.

2. The hinge of claim 1 where the closure panel bracket further comprises a plurality of holes for receiving fasteners to fixedly attach said closure panel bracket to said closure panel.

3. The hinge of claim 1 where the base member bracket further comprises a plurality of holes for receiving fasteners to fixedly attach said base member bracket to said base.

4. The hinge of claim 1 where the biasing driving end of the biasing link further comprises a guide pin.

5. The hinge of claim 4 where the base member bracket further comprises a pair of slots for receiving the guide pin and axially guiding the movement of the biasing driving end of the biasing link.

6. The hinge of claim 1 where the biasing link is longer than the intermediate link and shorter than the anchoring link.

7. The hinge of claim 1 where the intermediate link is shorter than the biasing link and the anchoring link.

8. The hinge of claim 1 where the closure panel bracket defines an outer end and an inner end.

9. The hinge of claim 8 where the inner end defines the closure panel bracket minor axis of rotation and the closure panel bracket major axis of rotation.

10. The hinge of claim 1 where the base member bracket defines an outer end and an inner end.

11. The hinge of claim 10 where outer end of the base member bracket defines the base member minor axis of rotation and the base member major axis of rotation.

12. The hinge of claim 1 where the outer end of the base member bracket is raised by a prescribed angle $\beta$ with respect to the inner end of the base member bracket.

13. The hinge of claim 1 where the closure panel bracket rotates through an angle $\alpha$ which is greater than 90° with respect to the base member bracket when the hinge is in the open configuration.

14. The hinge of claim 1 where the biasing member further comprises an air spring.

15. The hinge of claim 1 where the biasing member further comprises a helical spring.

16. A hinge for interconnecting a closure panel and a base, so that the closure panel may move rotationally and translatably between an open configuration and a closed configuration in relation to the base, the hinge comprising:

a closure panel bracket associated with the closure panel;

a base member bracket associated with the base, wherein the base member bracket has a longitudinal axis;

a link set having at least two links interconnecting the closure panel bracket and the base member bracket; and a biasing member fixedly mounted upon the base member bracket and constrained to move reciprocatively and axially along the base member bracket longitudinal axis;

the link set being adapted for cooperative movement among the links and the biasing member so as to facilitate the rotational and translational movement of the closure panel in relation to the base, such that the link set does not extend below the base member bracket when the closure panel is in the closed configuration.

17. The hinge of claim 16 wherein the base member bracket further comprises a slot for constraining the biasing member to move reciprocatively and axially along the base member bracket longitudinal axis.

18. The hinge of claim 16 wherein the base member bracket further comprises a pair of slots for constraining the biasing member to move reciprocatively and axially along the base member bracket longitudinal axis.

19. The hinge of claim 1 wherein the base member bracket further comprises at least one longitudinal slot for axially guiding the movement of the biasing driving end of the biasing link.

20. A hinge for interconnecting a closure panel and a base, so that the closure panel may move rotationally and translatably between an open configuration and a closed configuration in relation to the base, the hinge comprising:

a closure panel bracket associated with the closure panel, the closure panel bracket having a closure panel bracket major axis of rotation and a closure panel bracket minor axis of rotation;

a base member bracket associated with the base, the base member bracket having a base member major axis of rotation about which an anchoring link may rotate and a base member minor axis of rotation about which an intermediate link may rotate, the base member bracket further including a longitudinal slot; and a link set having:

a biasing link having a biasing driving end and a biasing driven end;

the intermediate link having an intermediate fixed end and an intermediate driving end; and the anchoring link having an anchoring driving end and an anchoring fixed end; and a biasing member fixedly mounted upon the base member bracket;

the biasing driving end of the biasing link being pivotally connected to the biasing member, the biasing driving end being constrained to move reciprocatively and axially along the longitudinal slot; the biasing driven end of the biasing link being pivotally connected to the intermediate driving end of the intermediate link and to the closure panel bracket proximate the closure panel bracket major axis of rotation;

the intermediate fixed end of the intermediate link being rotatably mounted upon the base member bracket at the base member minor axis of rotation;

the anchoring driving end of the anchoring link being connected to the closure panel bracket at the closure panel bracket minor axis; and the anchoring fixed end of the anchoring link being rotatably mounted upon the base member bracket proximate the base member major axis, the link set being adapted for cooperative movement among the biasing, intermediate, and anchoring links and the biasing member so as to facilitate the rotational and translational movement of the closure panel in relation to the base, such that the link set does not extend below the base member bracket when the closure panel is in the closed configuration.

* * * * *